W. C. STEVENS.
APPARATUS FOR USE IN THE MANUFACTURE OF AUTOMOBILE TIRES.
APPLICATION FILED MAY 7, 1918.

1,289,949.

Patented Dec. 31, 1918.
2 SHEETS—SHEET 2.

WITNESS

INVENTOR.
William C. Stevens
BY
ATTORNEY

UNITED STATES PATENT OFFICE.

WILLIAM C. STEVENS, OF AKRON, OHIO, ASSIGNOR TO THE FIRESTONE TIRE & RUBBER COMPANY, OF AKRON, OHIO, A CORPORATION OF OHIO.

APPARATUS FOR USE IN THE MANUFACTURE OF AUTOMOBILE-TIRES.

1,289,949.

Specification of Letters Patent.   Patented Dec. 31, 1918.

Application filed May 7, 1918.  Serial No. 233,108.

*To all whom it may concern:*

Be it known that I, WILLIAM C. STEVENS, a citizen of the United States, residing at Akron, county of Summit, State of Ohio, have invented certain new and useful Improvements in Apparatus for Use in the Manufacture of Automobile-Tires, of which the following is a specification.

In the process of manufacturing automobile tires in which the tire is cured on an expansible core or air bag under pressure, it is necessary to apply rings about the beads on the lower edges of the tire casings, having radially extended flanges between which the beads of the tire are held and thereby given the proper degree of pressure. The assembling of the tire casings and the tube on the air bag, on which the tire is cured, and the bead clamping rings is a difficult operation having required that a certain degree of fluid pressure be maintained on the inside of the air bag while the rings are applied, in order to cause the beads to seat themselves properly in the clamping rings, whereby sufficient pressure is obtained to properly mold them. It was formerly the practice to draw the clamping rings together by a number of C-clamps, which were drawn up in turn until the clamping rings were properly forced together whereupon bolts or clips were placed over the tongues of the clamping rings to hold them in place during the vulcanizing operation. This method of forcing the rings together was extremely laborious and took considerable time and to replace it I have devised the apparatus which forms the subject of this invention, by means of which the clamping rings may be quickly and accurately drawn into place.

In the drawings accompanying this specification I have shown one form of the device, but it is understood that changes and modifications may be made without departing from the spirit of the invention.

Figure 1:
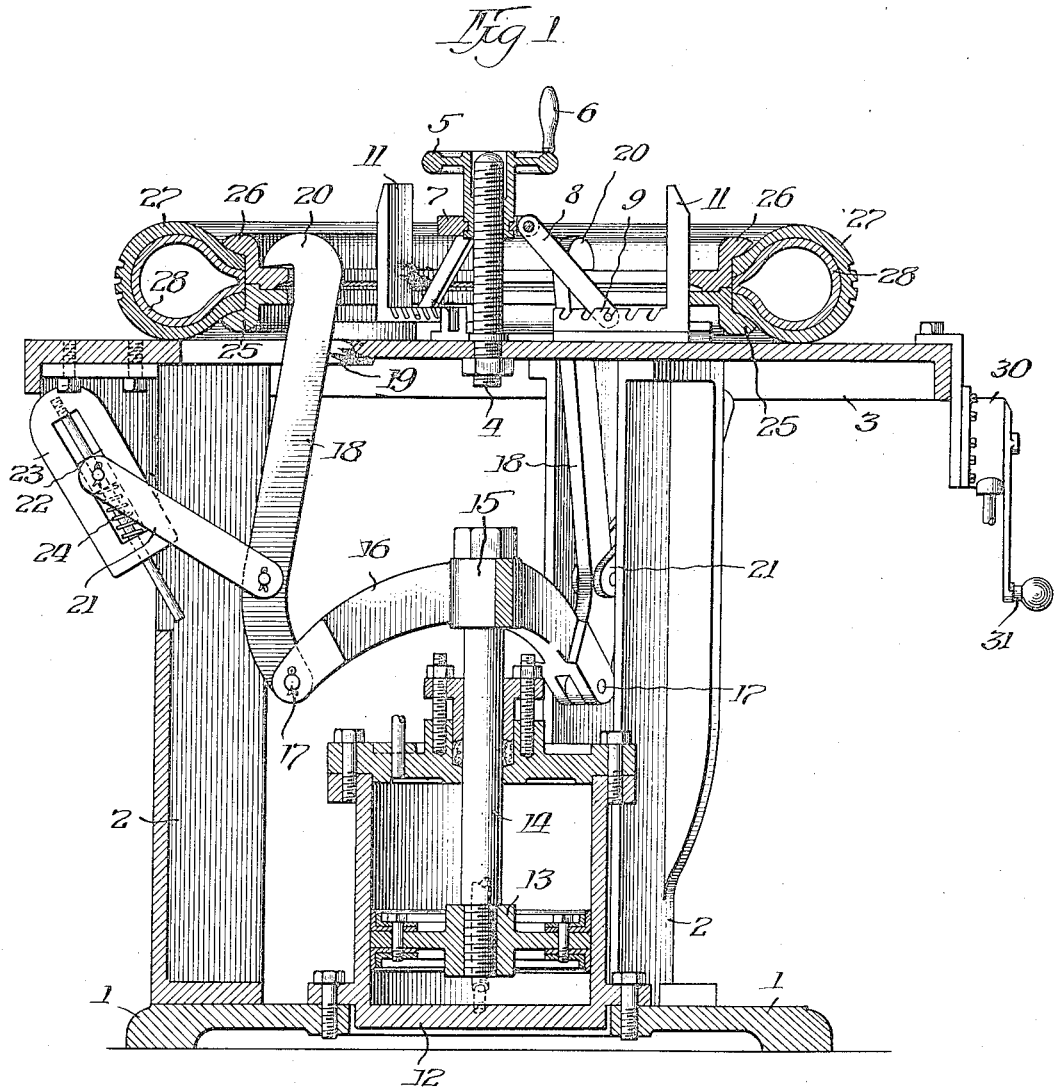
Figure 1 is a vertical section through the center of the apparatus.

The drawing 1 represents the base of the apparatus, from which rise three legs, or standards, which support the circular table 3 at a convenient height for the operator to handle the tire. In the center of the table is mounted a vertical screw shaft 4 connected with which is a nut 5 having a handle 6 by which it may be moved up and down on screw shaft 4. The nut 5 carries a collar 7 on which is pivotally mounted three links 8, each of which is adjustably connected to a slide 9 operated in guide ways 10 on the upper surface of the table. The slides 9 carry at their outer ends vertical fingers or guides 11. It will be seen that by adjusting the nut 5 the guides 11 may be moved to any position to accurately center a clamping ring of any diameter.

In the central portion of the base 1 there is secured a vertical cylinder 12, in which there is mounted a piston 13, the rod 14 of which carries at its upper end a head 15 having three arms 16 spaced equi-distantly around the table and carrying at their outer ends pivots 17. On the pivots 17 are mounted arms 18, the upper extremities of which pass through radial slots 19 in the table 3, the upper ends of these arms carrying hook shaped projections 20. A link 21 is connected to each arm at its lower end, the other end of the link being pivotally connected to a slide 22 movably mounted in a guide 23 secured to the frame. Between the slide 22 and the bottom of the guide 23 is mounted a spring 24. This construction and arrangement serves to draw the arms 18 outwardly as the piston 13 is forced downwardly, thereby insuring that the hooks securely clamp the rings in place, but when the piston is at the upward limit of its movement, the links will force the arms 18 backwardly out of the way.

Figure 2:
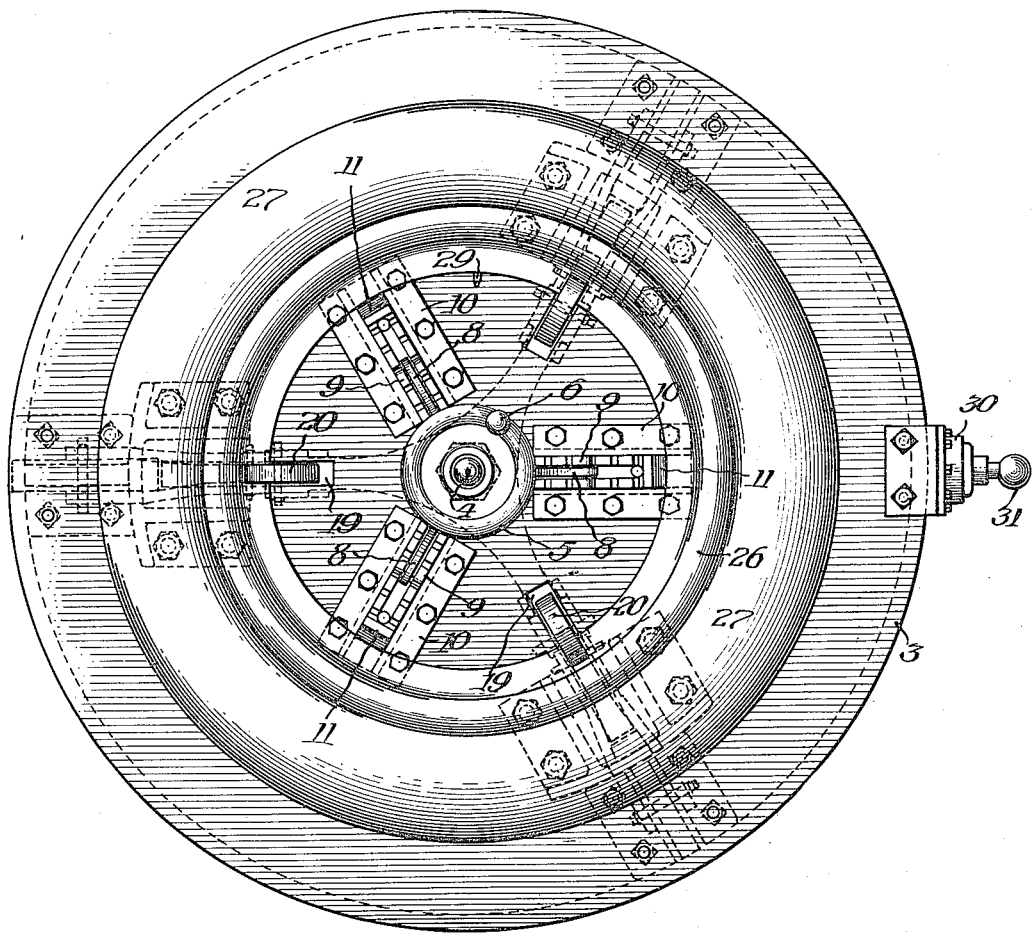
Fig. 2 is a plan view.

On the top of the table I have shown, Fig. 1, the two clamping rings, the lower being indicated by numeral 25 and the upper by the numeral 26. The tire is shown at 27 and the air bag at 28; the valve through which the air bag is filled being shown at 29, Fig. 2. A valve 30 is secured to the table 3 being provided with handle 31 by which the cylinder 12 may be operated.

The operation of the device is as follows:

The workman places the lower ring 25 on the table 3 and then adjusts the nut 5 to force the arms on guides 11 outwardly to center the ring. The tire 27 containing air bag 28 is placed over the ring 25 and ring 26 is positioned over the upper bead of the tire. Air under pressure is admitted to the air bag through valve 29 from any suitable source until it is forced outwardly against the inside of the casing and until the tire begins to be inflated. In the meantime the hooks 20, which have been at the upper limit of their movement, have been swung over the tongue of the upper ring 26 and the fluid pressure is introduced into cylinder 12 whereby arms 18 are brought downwardly drawing the rings together. When sufficient fluid pressure has been forced into air bag 28 to properly seat the bag and the lower edges of the tire in the rings, the pressure is relieved and the piston 13 forces the rings downwardly to the final position where they are secured by bolts through the tongues of the clamping rings, or clips, which are placed over them. The piston 13 is now forced in the opposite direction and the tire with the clamping rings is ready to be placed in the mold.

The steps in the operation of the machine are not given in their necessary order, as it is obvious that changes may be made in the procedure outlined; nor is the description of the machine given more than illustrative, as it is obvious that changes may be made without departing from the scope of the invention or sacrificing any of its benefits.

I claim:—

1. In an apparatus of the character described, the combination of a table, arms, means to move said arms vertically of the table, and means on the ends of the arms to engage bead clamping rings.

2. In an apparatus of the character described, the combination of a table, arms movable through the table, means on the ends of the arms to engage bead clamping rings, and mechanism to move the arms downwardly through the table.

3. In an apparatus of the character described, the combination of a table, arms movable through the table, hooks on the ends of the arms, mechanism to move the arms downwardly through the table, and means to move the arms outwardly as they move downwardly.

4. In an apparatus of the character described, the combination of a table, arms movable through the table, hooks on the ends of the arms, mechanism to move the arms downwardly through the table and means to move the arms outwardly as they approach the downward limit of their movement and inwardly as they approach the upward limit of their movement.

5. In an apparatus of the character described, the combination of a table, arms, means to move said arms vertically of the table, means on the ends of the arms to engage bead clamping rings and centering means for said rings.

6. In an apparatus of the character described, the combination of a table, arms movable through the table, hooks on the ends of the arms to engage bead clamping rings, guides for said rings, means to adjust the guides to center the rings and mechanism to move the arms downwardly through the table.

7. In an apparatus of the character described, the combination of a table, a plurality of arms movable through the table, hooks on the ends of the arms to engage bead clamping rings, a plurality of guides for said rings, means to simultaneously adjust the guides to center the rings and mechanism to move the arms simultaneously toward the table.

WILLIAM C. STEVENS.